(12) United States Patent
Sato (10) Patent No.: US 8,284,519 B2
(45) Date of Patent: Oct. 9, 2012

(54) MAGNETIC HEAD CLEANING MECHANISM OF THREADING SCHEME MAGNETIC TAPE APPARATUS

(75) Inventor: Kazushi Sato, Shinagawa-ku (JP)

(73) Assignee: NEC Embedded Products, Ltd., Tokyo (JP)

( * ) Notice: Subject to any disclaimer, the term of this patent is extended or adjusted under 35 U.S.C. 154(b) by 222 days.

(21) Appl. No.: 12/722,276

(22) Filed: Mar. 11, 2010

(65) Prior Publication Data
US 2010/0232063 A1 Sep. 16, 2010

(30) Foreign Application Priority Data

Mar. 12, 2009 (JP) ................................ 2009-059574
Sep. 17, 2009 (JP) ................................ 2009-215776

(51) Int. Cl.
*G11B 5/41* (2006.01)
*G11B 23/107* (2006.01)

(52) U.S. Cl. ...................................... 360/128

(58) Field of Classification Search ............... 360/128
See application file for complete search history.

(56) References Cited

U.S. PATENT DOCUMENTS

| | | | | |
|---|---|---|---|---|
| 6,067,211 A | * | 5/2000 | Chliwnyj et al. | 360/128 |
| 6,437,938 B1 | * | 8/2002 | Wada | 360/95 |
| 2002/0181145 A1 | * | 12/2002 | Tsuchiya | 360/128 |
| 2003/0075633 A1 | * | 4/2003 | Shimanuki et al. | 242/332.4 |
| 2004/0042120 A1 | * | 3/2004 | Davis | 360/128 |
| 2006/0109589 A1 | * | 5/2006 | Tsuneyoshi et al. | 360/128 |
| 2006/0256474 A1 | * | 11/2006 | Tanaka | 360/128 |

FOREIGN PATENT DOCUMENTS

| | | | |
|---|---|---|---|
| JP | 2006-155683 A | | 6/2006 |
| JP | 2006-318563 A | | 11/2006 |

* cited by examiner

*Primary Examiner* — Craig A. Renner
(74) *Attorney, Agent, or Firm* — Sughrue Mion, PLLC (57) ABSTRACT

In a magnetic head cleaning mechanism applicable to a magnetic tape apparatus employing a threading scheme, a cleaning brush is driven in a small space. The mechanism includes a threading arm to engage a leader block with a leader pin to draw the block engaged with the pin, a magnetic head to conduct data reading and writing operation on a magnetic tape, a rotatably supported brush link arm including a brush at a tip end thereof, and a cam gear disposed on the side of the magnetic head relative to a threader track. Ordinarily, the arm is on the side of the magnetic head relative to the threader track. When the leader block is moved to a position near the leader pin, the arm rotates with rotation of the cam gear to bring the brush into contact with the magnetic head on the threader track.

12 Claims, 13 Drawing Sheets

MAGNETIC HEAD CLEANING MECHANISM OF THREADING SCHEME MAGNETIC TAPE APPARATUS

This application is based upon and claims the benefit of priority from Japanese patent application No. 2009-059574, filed on Mar. 12, 2009, and Japanese patent application No. 2009-215776, filed on Sep. 17, 2009, the disclosure of which is incorporated herein in its entirety by reference.

BACKGROUND OF THE INVENTION

1. Field of the Invention

The present invention relates to a magnetic head cleaning mechanism for cleaning a magnetic head to conduct reading and writing operations of information on a magnetic tape and a magnetic tape apparatus including the magnetic head cleaning mechanism.

2. Description of the Related Art

A magnetic tape apparatus includes a mechanism, which transports, at installation of a cartridge therein, a tip end of an unused magnetic tape wound around a supply reel in the cartridge up to a hub of a windup reel in the apparatus to thereby fixedly install the tape thereon.

For this purpose, a mechanism called "threading scheme" is known. According to the threading scheme, a cam gear and a threading arm to be moved by the gear are used to transport a leader block along a magnetic tape transporting route up to a supply reel, and to transport, after engaging a leader pin disposed at a tip end of the magnetic tape with a leader block, the leader block again along the transporting route up to a windup reel. The magnetic tape transporting route will be referred to as a threader track hereinbelow.

In a magnetic tape apparatus, to retain favorable reading and writing efficiency of its magnetic head, it is required to periodically clean the magnetic head.

Techniques associated with the magnetic head cleaning mechanism include "a head cleaning mechanism for a magnetic tape apparatus" described in Japanese Patent Laid-Open Publication Ser. No. 2006-318563 and "a recording and reproducing apparatus" described in Japanese Patent Laid-Open Publication Ser. No. 2006-155683.

According to the techniques described in these documents, the magnetic tape apparatus includes an arm employing a cleaning brush. In an ordinary state, the brush is placed at a position not to hinder the tape from running. In a cleaning state, the arm is rotated to bring the brush into contact with the magnetic head.

In short, the techniques employ a configuration in which the threader track exists between the arm with the brush and the magnetic head. In this configuration, a driving source to turn the cleaning brush and the arm to the cleaning position is arranged at a position opposite to the magnetic head with the threader track therebetween.

In such configuration, to bring the brush into contact with the magnetic head, it is required to move the brush to cross the threader track in the cleaning state. Hence, the brush moves in a large stroke. The moving track of the brush is a dead space in which parts and the like cannot be placed. Therefore, when the stroke becomes larger, the apparatus is increased in size.

To remove this problem in the techniques of the above documents, it can be considered to place the driving source on a side opposite to the threader track such that the brush is disposed at a position on the side of the magnetic head relative to the threader track.

However, for a magnetic tape apparatus using the threading scheme, the threading arm moves over the threading track or an upper or lower position thereof on the magnetic side. It is hence difficult to dispose a mechanism not to interfere with the threading arm, the mechanism supplying power from a driving source placed on the opposite side of the thread track to the brush disposed on the magnetic side relative to the threader track.

As above, a need exists for a magnetic head cleaning mechanism which is applicable to a magnetic tape apparatus employing the threading scheme and which drives the cleaning brush in a small space.

SUMMARY

It is therefore an object of the present invention to provide a magnetic head cleaning mechanism which is applicable to a magnetic tape apparatus employing the threading scheme and which drives the cleaning brush in a small space and a magnetic tape apparatus including the magnetic head cleaning mechanism.

To achieve the object in accordance with the present invention, there is provided a magnetic head cleaning mechanism including a threading arm for transporting a leader block which can be engaged with a leader pin disposed at a tip end of a magnetic tape wound around a supply reel, engaging the leader block with the leader pin, and drawing the leader block engaged with the leader pin up to a windup reel; a magnetic head for reading data from and writing data on the magnetic tape by using magnetic force; an arm comprising a cleaning member at a tip end thereof, the arm being supported to be able to rotate, and a cam gear for driving the threading arm, the cam gear being disposed on a side of the magnetic head relative to a track of a threader as a route to transport the magnetic tape. The arm is at a position on a side of the magnetic head relative to the threader track in an ordinary state, and the arm rotates, when the leader block is transported to a position near the leader pin, in association with rotation of the cam gear to thereby bring the cleaning member into contact with the magnetic head on the threader track.

In accordance with the present invention, there is provided a magnetic tape apparatus including the magnetic head cleaning mechanism.

BRIEF DESCRIPTION OF THE DRAWINGS

The objects and features of the present invention will become more apparent from the consideration of the following detailed description taken in conjunction with the accompanying drawings in which.

EXEMPLARY EMBODIMENTS

Referring next to the accompanying drawings, description will be given of embodiments in accordance with the present invention.

Embodiment 1

Figure 1:
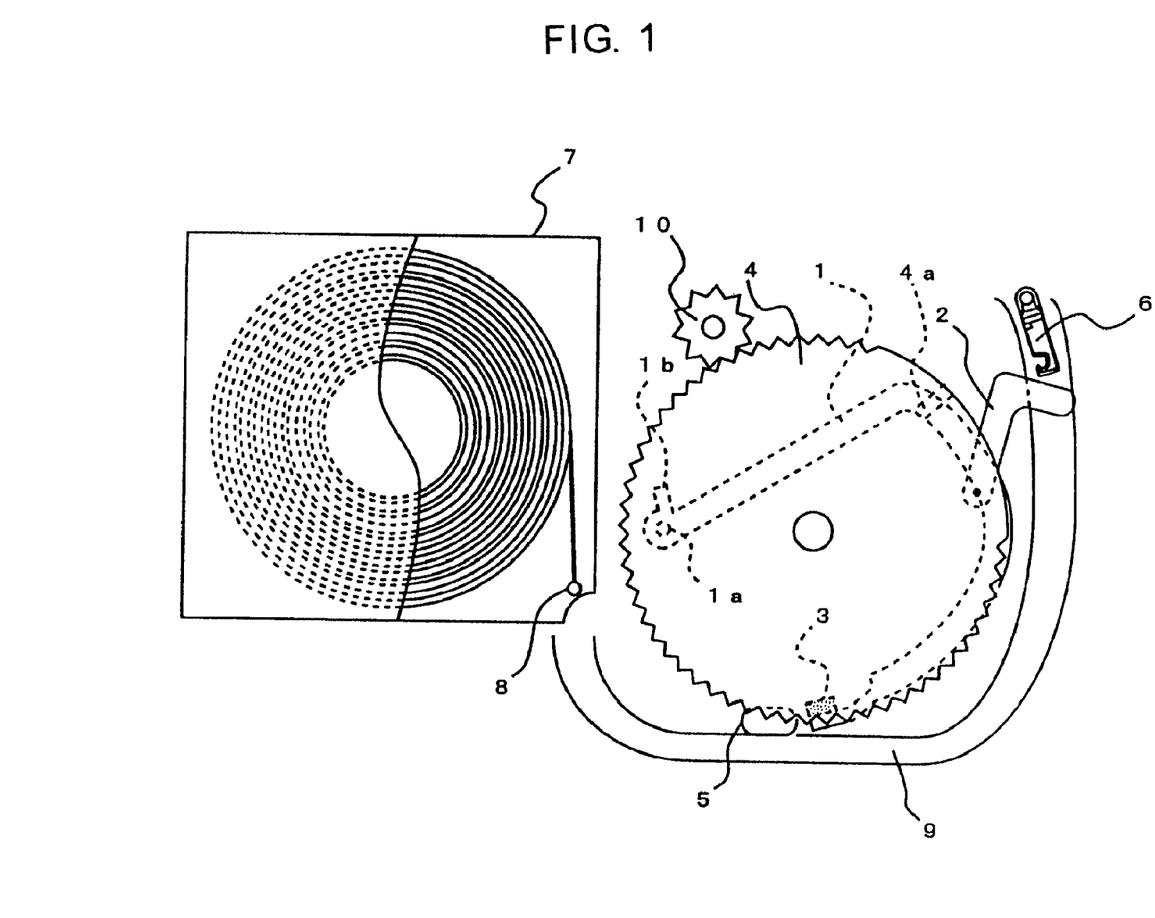
FIG. 1 is a schematic diagram showing structure of an embodiment of a magnetic head cleaning mechanism for a magnetic tape apparatus in accordance with the present invention.

FIG. 1 shows a configuration of a first embodiment of a magnetic head cleaning mechanism for a magnetic tape apparatus in accordance with the present invention. The cleaning mechanism includes a brush link arm 1, a threading arm 2, a brush 3, and a cam gear 4.

The brush link arm 1 is rotable about a pivot 1a and is energized by a torsion spring, which is not shown and which is disposed at the pivot 1a, toward a direction to go away from the thread track 9. In an ordinary state, the brush link arm 1 is placed at a predetermined position or a shelter position not to overlap with the thread track 9. At a tip end of the brush link arm 1, a brush 3 is disposed to clean a magnetic head 5. In the brush link arm 1, an end section opposite to the end of the brush 3 is bent toward the side of the cam gear 4 to resultantly configure a contact section 1b. It is favorable that the brush link arm 1 is formed by bending a flat bar in one and the same plane. This structure advantageously reduces the magnetic head cleaning mechanism in thickness.

The threading arm 2 is rotably attached onto the cam gear 4 in the vicinity of a first end thereof. A second end opposing the first end of the arm 2 is arranged on the thread track 9. The threading arm 2 moves along the track 9 in association with rotation of the cam gear 4 to transport a leader block 6 along the thread track 9 from a home position to a leader pin 8 attached onto a tip end of a magnetic tape installed in a cartridge 7. Also, threading arm 2 transports the leader block 6 engaged with the leader pin 8 along the thread track 9 to a windup reel, not shown. In this connection, a mechanism, which moves the leader block 6 in cooperation with the threading arm 2, is well known and is hence not shown for simplification of description.

In a state wherein the brush link arm 1 is at the shelter position, the brush 3 is at a position on the side of the magnetic head 5. Hence, the thread track 9 exists in other than the space between the brush 3 and the magnetic head 5.

The cam gear 4 includes teeth formed in an outer circumference thereof. The cam gear 4 rotates when the teeth receive a driving force via a gear 10 from a driving source or a motor, not shown. In the structure, the teeth are formed in the outer circumference excepting one section thereof. Hence, the cam gear 4 cannot completely make one turn, but can rotate in a range in which the teeth are formed.

On a surface of the cam gear 4 opposing the surface of the brush link arm 1, a projected section 4a is arranged. The projection 4a is formed with height such that the projection 4a makes contact substantially only with the contact section 1b. It is also possible that the cam gear 4 includes a thin section and a thick section such that substantially only the thick section makes contact with the contact section 1b.

Description will now be given of operation of the magnetic head cleaning mechanism. In the first embodiment of the cleaning mechanism, the cleaning operation of the magnetic head 5 is conducted during the transportation of the tip end of the magnetic tape installed in the cartridge 7 to the windup reel, namely, during the threading operation.

FIG. 1 shows the initial state as the starting point of the threading operation.

Figure 2:
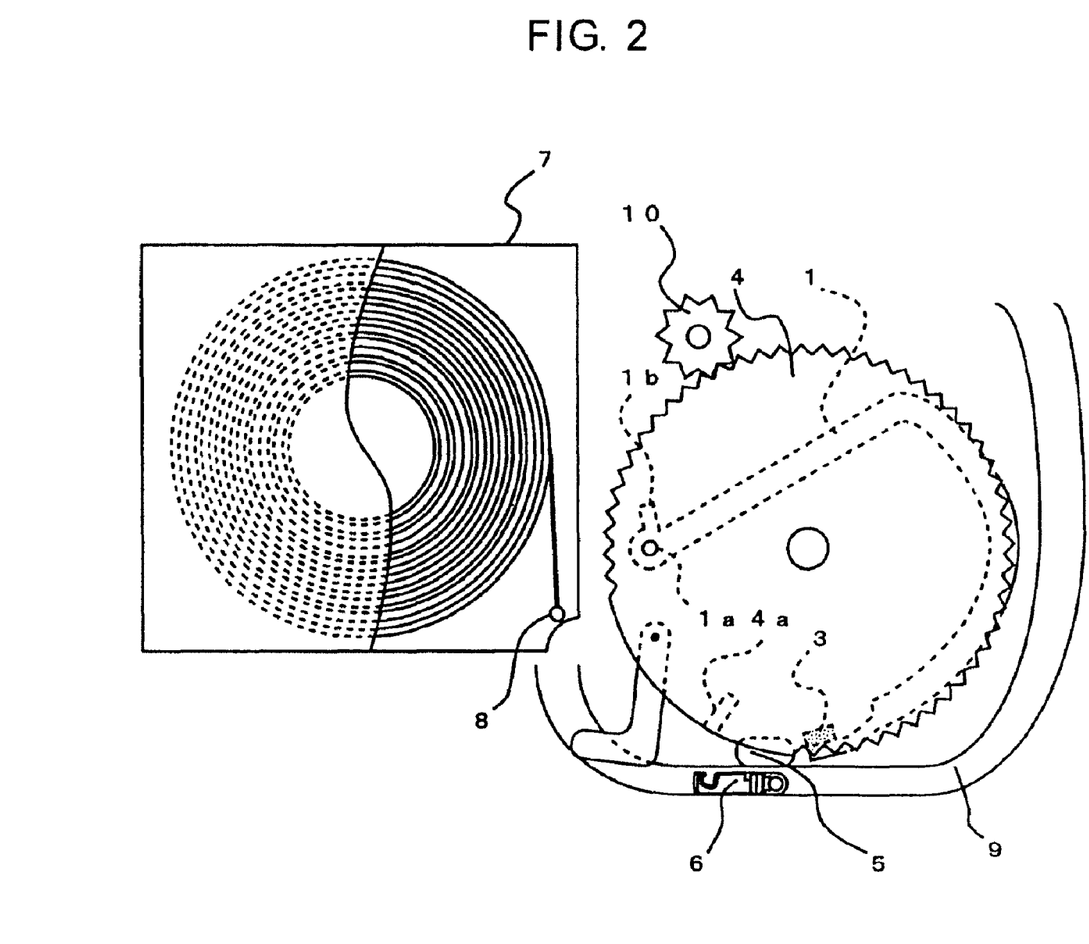
FIG. 2 is a diagram showing a state to move a leader block from an initial position along a thread track to a position on a cartridge side.

Driving force of the driving source, not shown, is imparted via the gear 10 to the cam gear 4. When the cam gear 4 rotates clockwise in FIG. 1, the threading arm 2 attached to the cam gear 4 moves along the thread track 9 to transport the leader block 6 along the thread track 9 as shown in FIG. 2.

Figure 3:
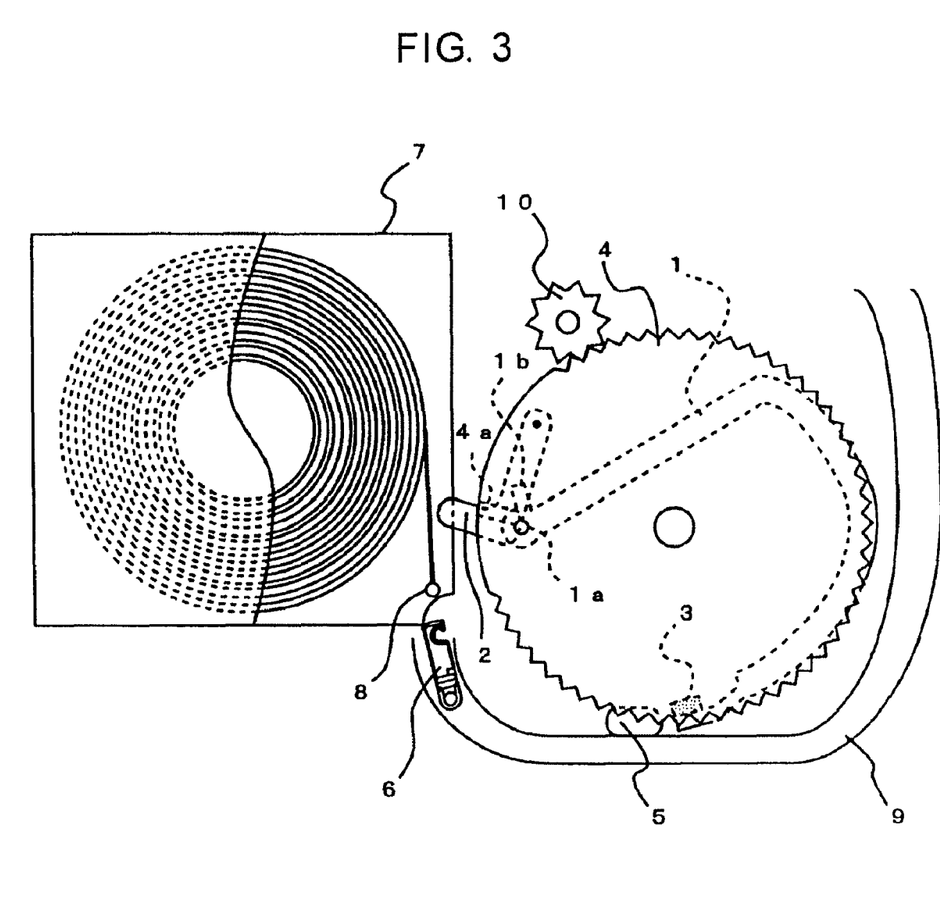
FIG. 3 is a diagram showing operation to move the leader block along the thread track to a position near the cartridge side.

When the cam gear 4 further rotates clockwise and the leader block 6 reaches a position near the cartridge 7, the projection 4a comes into contact with the contact section 1b as shown in FIG. 3. Thereafter, according to the clockwise rotation of the cam gear 4, the contact section 1b moves against force of the torsion spring, not shown. The brush link arm 1 starts rotating from the shelter position to a position on the threader track 9.

Figure 4:
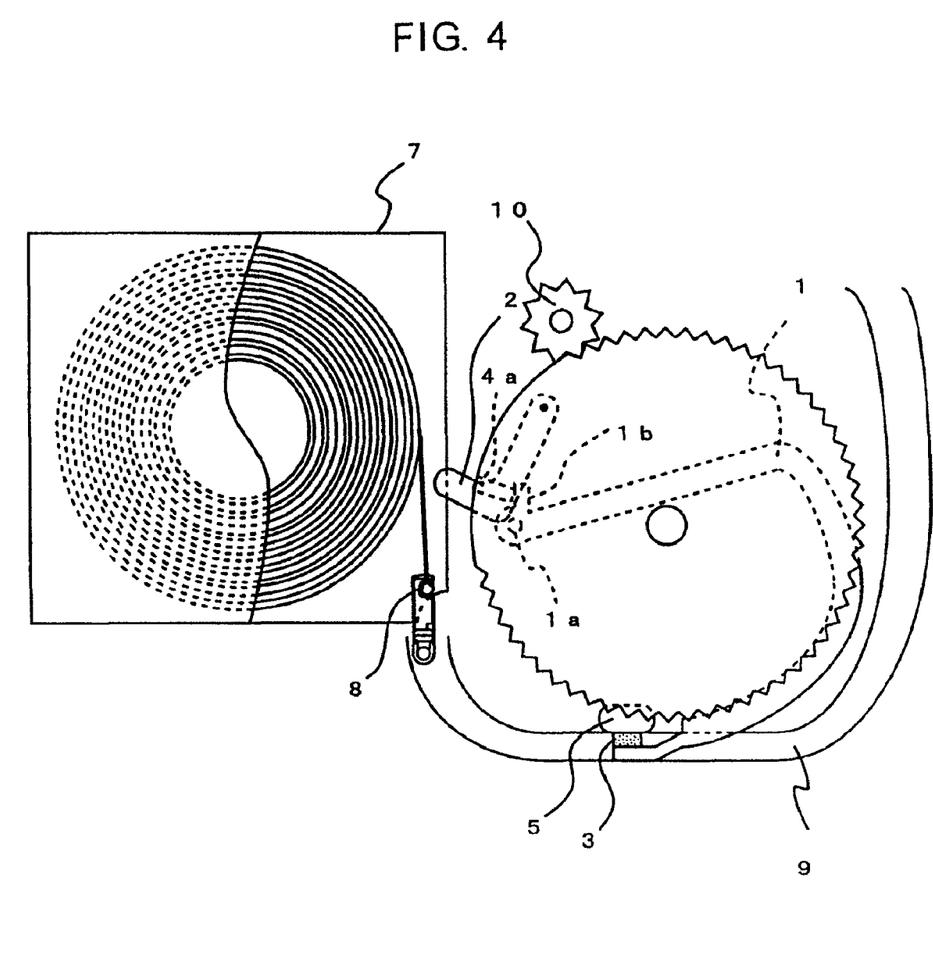
FIG. 4 is a diagram showing a state in which the leader block engages with a leader pin and a brush link arm is placed at a cleaning position.

When the cam gear 4 continuously rotates clockwise, the leader block 6 engages with the leader pin 8 as shown in FIG. 4. The teeth in the outer circumference of the cam gear 4 are arranged to prevent the cam gear 4 from further rotating clockwise relative to the state of FIG. 4. Specifically, the circumference of the cam gear 4 includes a section not provided with teeth such that the gear 10 cannot clockwise rotate the cam gear 4. That is, the position where the leader block 6 engages with the leader pin 8 is the end point of the movement of the leader block 6.

In the state wherein the leader block 6 is at the end point as above, the brush link arm 1 is placed at a cleaning position in front of the magnetic head 5. In this state, the brush 3 is brought into contact with the magnetic head 5 by predetermined force. When the brush link arm 1 is placed at the shelter position, the brush 3 is at a position on the side of the magnetic head 5 relative to the thread track 9. Hence, when the brush link arm 1 rotates from the shelter position to the cleaning position, the moving path of the brush 3 does not cross the threader track 9. This resultantly reduces the stroke of the brush 3 when compared with the techniques described in Japanese Patent Laid-Open Publication Ser. Nos. 2006-318563 and 2006-155683.

As above, the brush link arm 1 is placed at the cleaning position when the cam gear 4 reaches at the end point of the rotable zone. It is hence possible to automatically set the brush 3 to a predetermined position without conducting any particular positioning operation.

With the brush link arm 1 placed at the cleaning position, the magnetic head cleaning mechanism drives the magnetic head 5 to vertically reciprocate for the cleaning thereof. The cleaning operation is possible by use of a known configuration.

Figure 5:
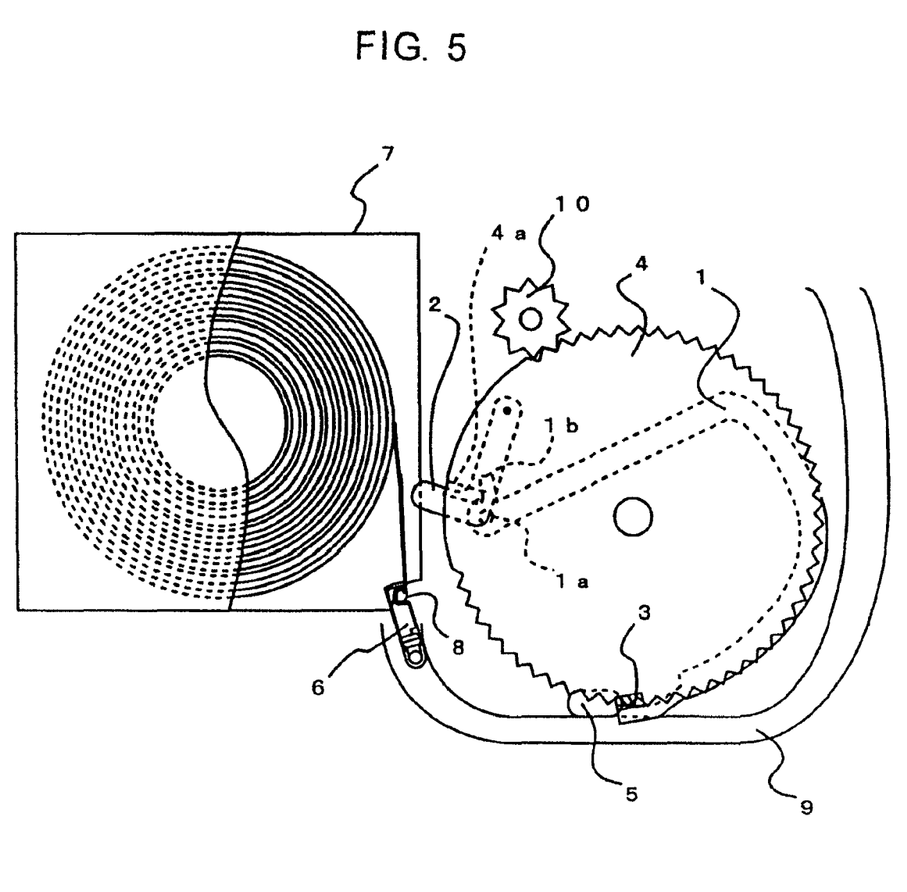
FIG. 5 is a diagram showing a state to start an operation to draw a magnetic tape from the cartridge.

After the cleaning is finished, the driving source, not shown, transmits driving force via the gear 10 to the cam gear 4 to counterclockwise rotate the cam gear 4. Hence, the magnetic tape is drawn as shown in FIG. 5. When the cam gear 4 turns counterclockwise, the threading arm 2 attached to the cam gear 4 moves in the opposite direction. The leader block 6 accordingly moves via the thread track 9 to the initial position.

As a result of the counterclockwise rotation of the cam gear 4, the brush link arm 1 having turned to the cleaning position starts rotating toward the shelter position by force of the torsion spring, not shown.

Figure 6:
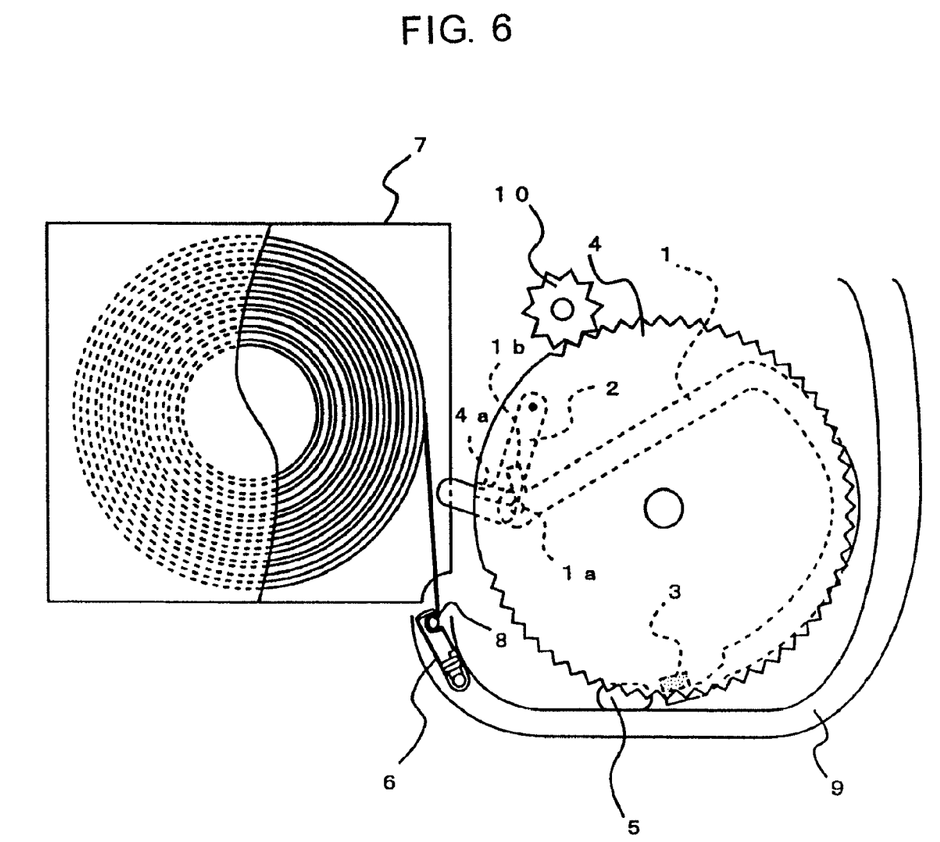
FIG. 6 is a diagram showing operation in which the leader block leaves the cartridge and the brush link arm returns to a shelter position.

When the cam gear 4 is further rotated counterclockwise, the leader block 6 with the leader pin 8 leaves the cartridge 7 as shown in FIG. 6. The projection 4a of the cam gear 4 leaves the contact section 1b of the brush link arm 1, which then returns to the shelter position.

Figure 7:
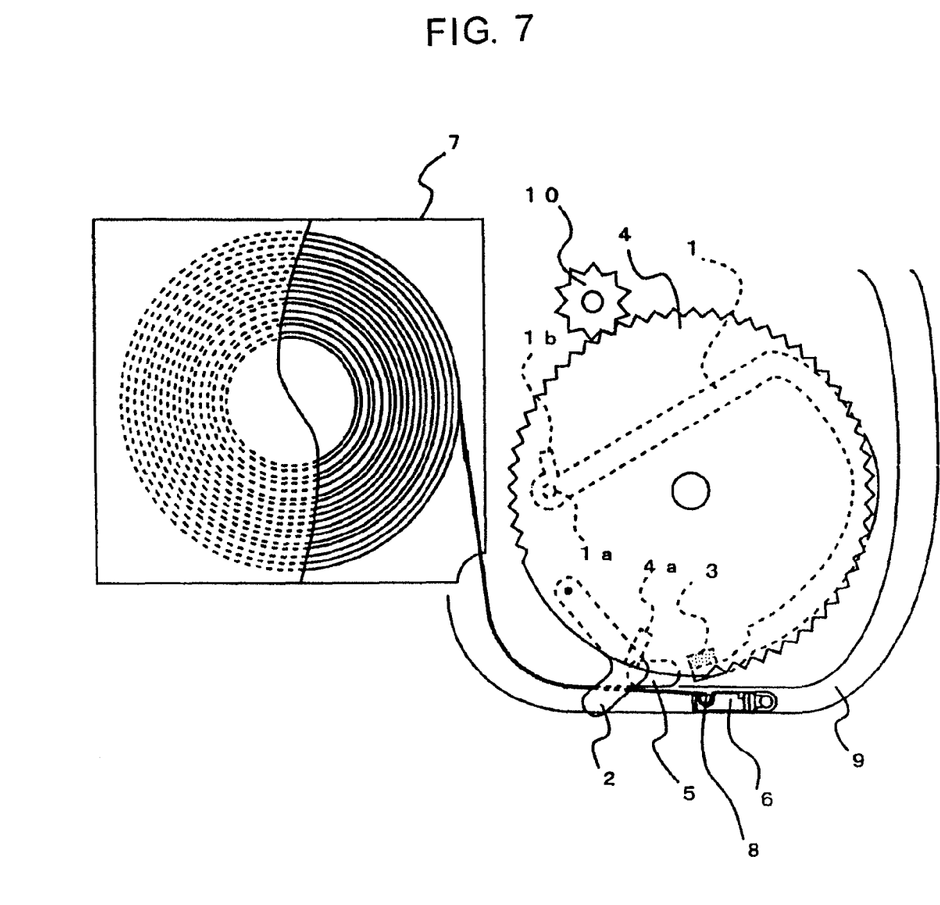
FIG. 7 is a diagram showing a state in which a magnetic tape is being drawn from the cartridge.

As can be seen from FIG. 7, the cam gear 4 is further rotated counterclockwise to transport the leader block 6 along the threader track 9 to the initial position. The brush link arm 1 is kept retained at the shelter position. Thereafter, the leader block 6 is transported up to the windup reel, not shown, to engage the leader pin 8 with the windup reel. This operation is feasible by a known mechanism; hence, detailed description thereof will be avoided.

Since the magnetic head cleaning mechanism in accordance with the first embodiment is able to reduce the stroke of the brush, it is possible to downsize the apparatus, which employs the cleaning mechanism.

Also, the brush link arm is turned by use of a cam gear to drive the threading arm. Hence, it is not required to dispose a driving source exclusively for the movement of the brush.

Since the brush link arm does not cross the threader track, the magnetic head cleaning mechanism is applicable also to a magnetic tape apparatus using the threading scheme.

In accordance with the first embodiment, it is possible to provide a magnetic head cleaning mechanism which is applicable to a magnetic tape apparatus utilizing the threading scheme and which drives the cleaning brush in a small space and a magnetic tape apparatus including the magnetic head cleaning mechanism.

Embodiment 2

Description will now be given of a second embodiment in accordance with the present invention. According to the second embodiment, the brush link arm 1 is driven in other than the way employed in the first embodiment.

In the first embodiment, the brush link arm 1 is driven to rotate by force of the torsion spring. That is, in the driving operation to clockwise rotate the brush link arm 1 from the shelter position, the projection 4a of the cam gear 4 downward pushes, in response to the clockwise rotation of the cam gear 4, the contact section 1b disposed near the pivot 1a of the brush link arm 1 (reference is to be made to FIGS. 3 and 4). At the pivot 1a, a torsion spring, not shown, is arranged to apply force in the counterclockwise direction. Hence, when pushed downward by the contact section 1b, the projection 4a resists against the force. In the operation to counterclockwise rotate the brush link arm 1 from the cleaning position, the projection 4a, which is pushing the contact section 1b, leaves therefrom in cooperation with the counterclockwise rotation of the cam gear 4. Hence, there appears counterclockwise force to drive the brush link arm 1 to rotate counterclockwise (reference is to be made to FIGS. 5 and 6).

However, when the brush link arm 1 cleans the brush 3 at the cleaning position, there possibly occurs a situation wherein hairs of the brush 3 are caught by the magnetic head 5. In such situation, the energizing force of the torsion spring is insufficient. This leads to a problem in which the brush link arm 1 cannot be driven to rotate counterclockwise from the cleaning position to return to the shelter position.

The problem will be removed in accordance with the second embodiment. Description will be given of an example of a configuration to forcibly return the brush link arm 1 to the shelter position without using the energizing force of the spring.

Figure 8:
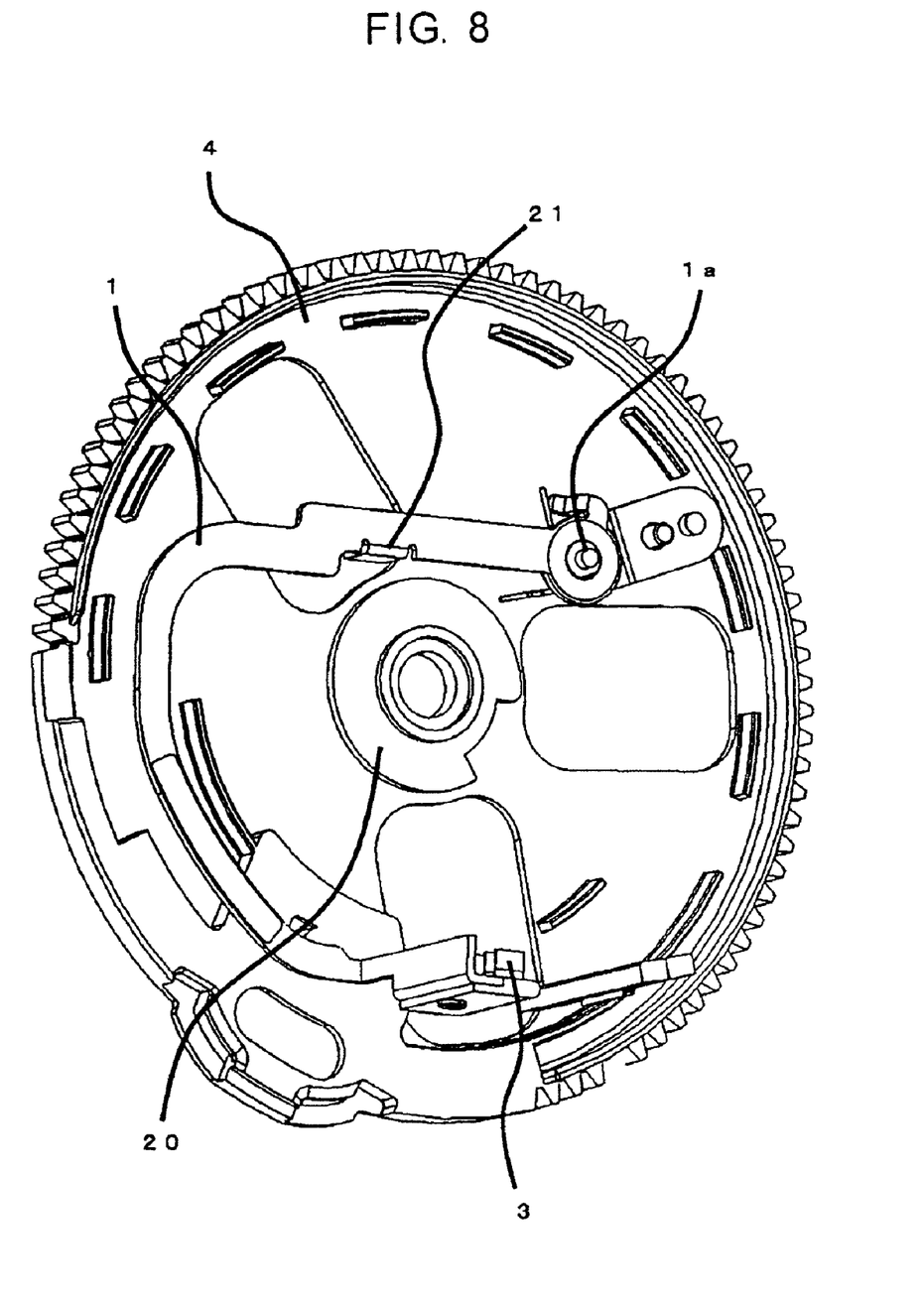
FIG. 8 is a perspective view showing an appearance of a surface of a cam gear with the brush link arm arranged thereon.

FIG. 8 shows, in a perspective view, an appearance of a surface of the cam gear 4 on which the brush link arm 1 is installed. In the brush link arm 1, a pivot 1a and a brush 3 are disposed respectively at a first end and a second end of the arm 1. The brush link arm 1 clockwise or counterclockwise rotates about the pivot 1a. The cam gear 4 and the brush link arm 1 are similar in the basic configuration and operation to those of the first embodiment.

The second embodiment differs from the first embodiment in that a projection 21 is formed in the brush link arm 1 and a projection push-down section 20 is formed in the cam gear 4. The projection 21 is configured to be integral with the brush link arm 1 on the side of the pivot 1a relative to the brush link arm 1. The projection push-down section 20 is formed to be integral with the cam gear 4 in a central section of the cam gear 4. The projection 21 operates in cooperation with the brush link arm 1 and the projection push-down section 20 operates in association with the cam gear 4.

Figure 9A:
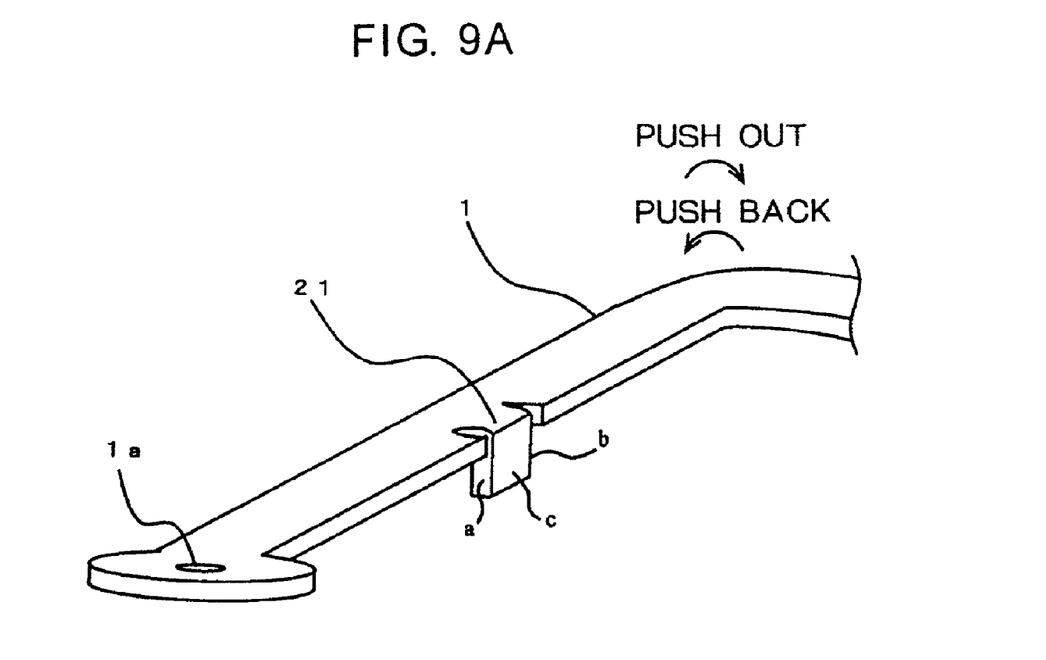
FIG. 9A is a perspective view showing an appearance of a projected section of the brush link arm.

The projection 21 will be described. FIG. 9A is a perspective view showing an appearance of the projection 21 in the brush link arm 1. The projection 21 is formed in a surface of the brush link arm 1 to be vertical to the surface. The projection 21 has a contour substantially similar to a rectangular parallelepiped. The projection 21 includes a first side surface a and a second side surface b opposing the surface a. When the brush link arm 1 is pushed out, the first side surface a is pushed downward by the projection push-down section 20. When the brush link arm 1 is pushed back, the second side surface b is pushed downward by the push-down section 20.

Figure 9B:
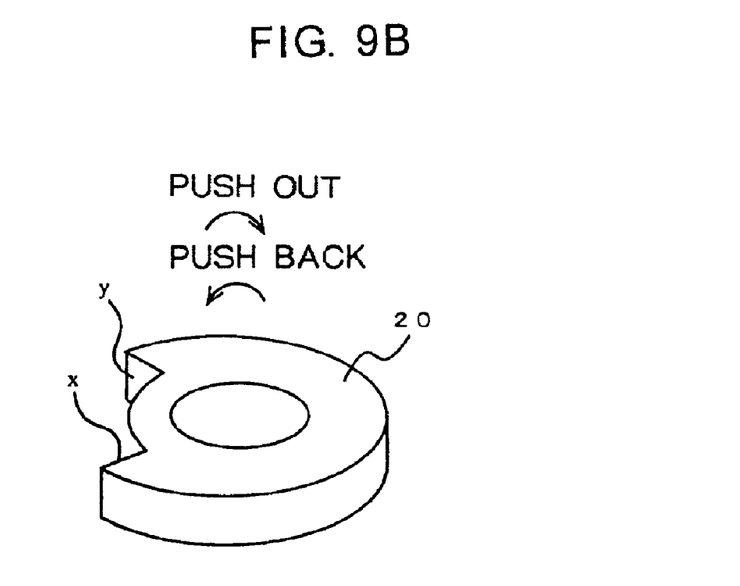
FIG. 9B is a perspective view showing an appearance of a projection pushing section of the cam gear.

Description will now be given of the projection push-down section 20. FIG. 9B is a perspective view showing an appearance of the projection push-down section 20 in the cam gear 4. The cam gear 4 actually disposed below the push-down section 20 is not shown. As FIG. 9B shows, the push-down section 20 has a contour of a partly recessed cylinder. The recessed section is defined by a first side surface x and a second side surface y of the push-down section 20. The surface x rotates in association with rotation of the cam gear 4 when the brush link arm 1 is pushed out to push down the side surface a of the projection 21. The surface y rotates in cooperation with rotation of the cam gear 4 when the brush link arm 1 is pushed back to push down the side surface b of the projection 21. In this sense, the projection push-down section 20 may be referred to as "rotating push-down section".

Description will be given of operations of the projection 21 and the projection push-down section 20. The push-down section 20 rotates in association with rotation of the cam gear 4. In the operation to push out the brush link arm 1 from the shelter position, when the cam gear 4 rotates clockwise, the surface x of the push-down section 20 pushes down the surface a of the projection 21. As a result, the brush link arm 1 is driven to rotate clockwise. In the operation to push back the brush link arm 1 to the shelter position, when the cam gear 4 rotates counterclockwise, the surface y of the push-down section 20 pushes down the surface b of the projection 21. Hence, the brush link arm 1 is driven to rotate counterclockwise. In the operation, when the brush link arm 1 further rotates, a circumferential surface of the push-down section 20 adjacent to the surface y passes over a surface c between the surfaces a and b of the projection 21 to approach the shelter position of the brush link arm 1.

Referring now to FIGS. 10 to 16, description will be given of operations to push out and to push back the brush link arm 1. For convenience of explanation, the threading arm 2, the leader block 6, the leader pin 8, and the cartridge 7 are not shown in FIGS. 10 to 16. However, these items are actually arranged to operate in FIGS. 10 to 16 in almost the same way as for the first embodiment. On the other hand, the projection 4a and the contact section 1b shown in FIGS. 1 to 7 are not employed in FIGS. 10 to 16.

Figure 10:
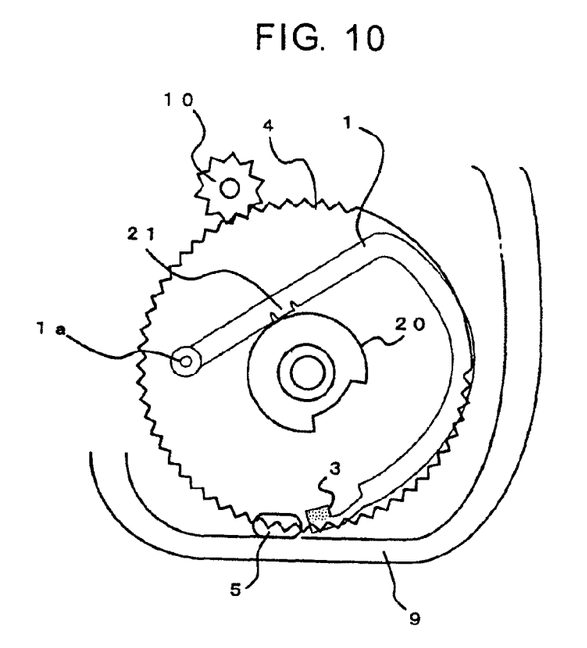
FIG. 10 is a diagram showing a state to start a threading operation.

FIG. 10 shows an initial state to start a threading operation. In this situation, the brush link arm 1 is placed at the shelter position not to overlap with the thread track 9. In the state shown in FIG. 1, the cam gear 4 rotates clockwise as described in conjunction with the first embodiment.

Figure 11:
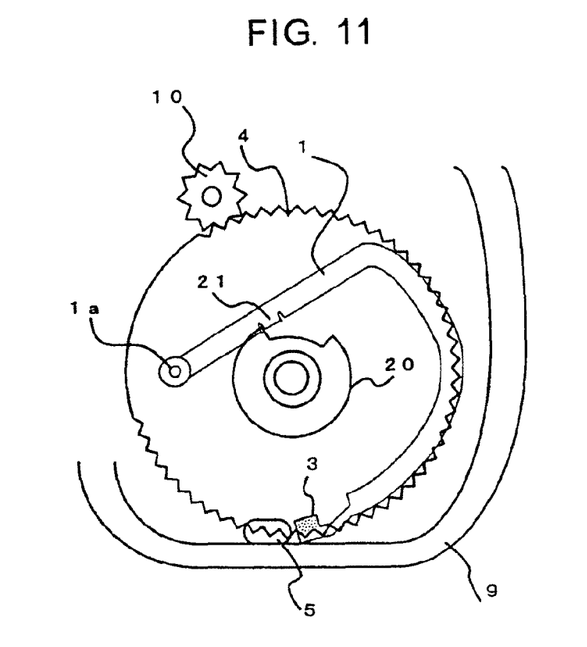
FIG. 11 is a diagram showing a state to start the brush link arm push-out operation.

FIG. 11 shows a state to start the brush link arm push-out operation. When the cam gear 4 continuously rotates in the state shown in FIG. 10, the surface x of the projection push-down section 20 is brought into contact with the surface a of the projection 21 as shown in FIG. 11. After this point, in association with the clockwise rotation of the cam gear 4, the brush link arm 1 being depressed downward by the push-down section 20 starts rotating from the shelter position to the side of the threader track 9.

Figure 12:
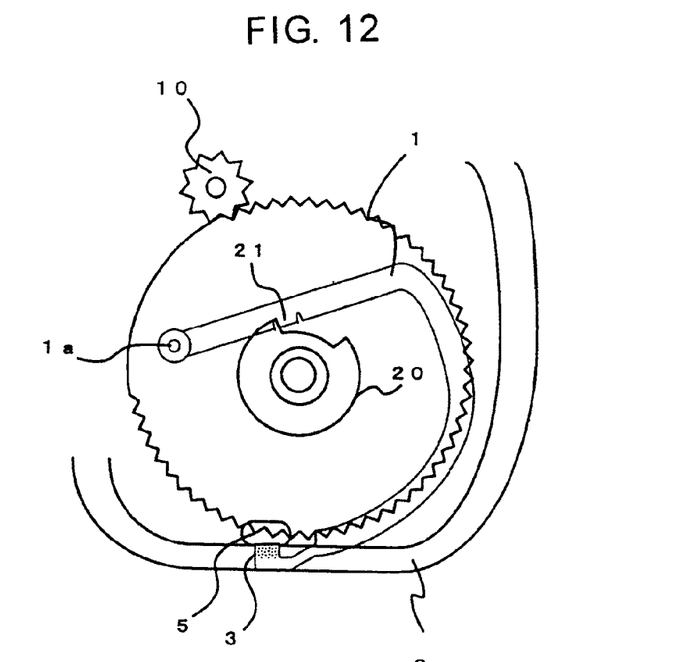
FIG. 12 is a diagram showing operation in which a brush of the brush link arm reaches at the cleaning position.

FIG. 12 shows a state in which the brush 3 of the brush link arm 1 reaches at the cleaning position. In this situation as in FIG. 4, the toothless section of the outer circumference of the cam gear 4 prevents the cam gear 4 from further rotating clockwise. At the cleaning position shown in FIG. 12, the brush 3 cleans the magnetic head 5 as described in conjunction with the first embodiment.

Figure 13:
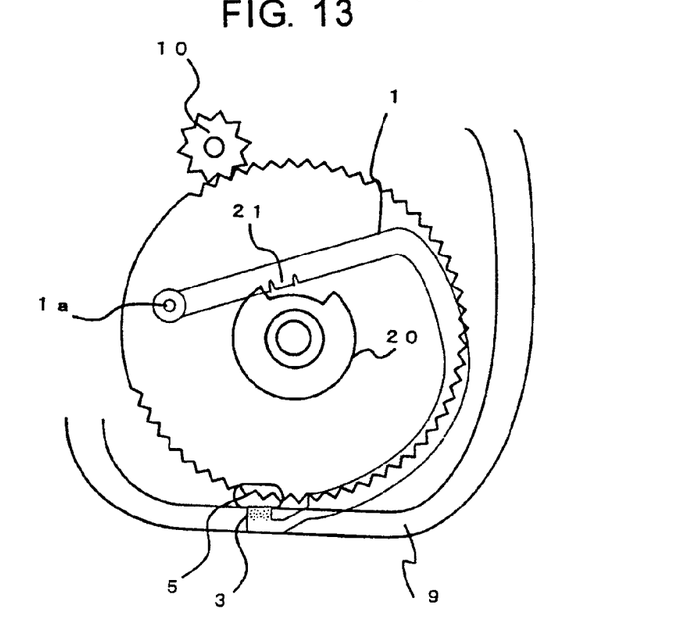
FIG. 13 is a diagram showing a state in which the cam gear starts rotating counterclockwise after the cleaning.

FIG. 13 shows a state in which the cam gear 4 starts rotating counterclockwise after the cleaning. Specifically, after the cleaning is finished, the cam gear 4 starts rotating counterclockwise. In the operation, the surface x of the projection push-down section 20 pushing the surface a of the projection 21 leaves the surface a.

Figure 14:
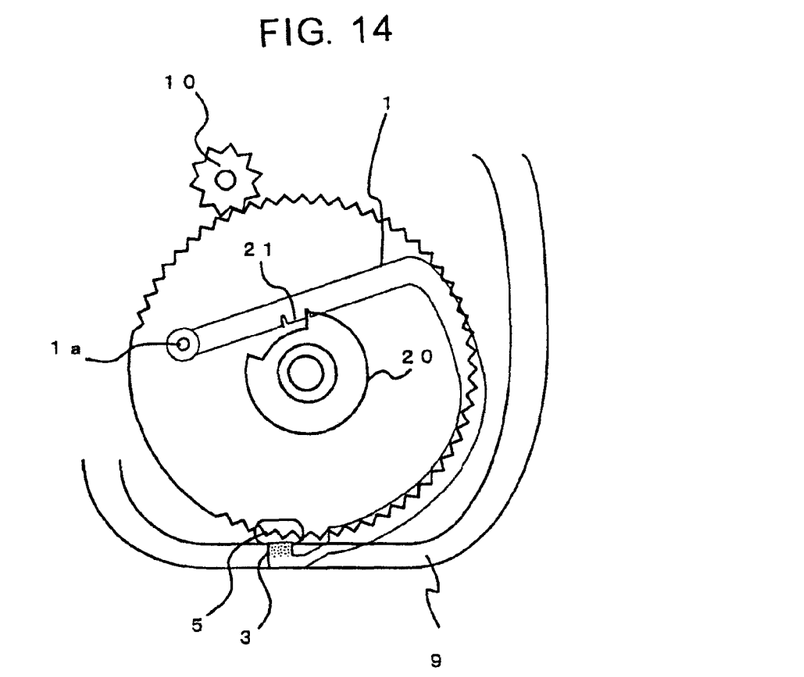
FIG. 14 is a diagram showing a process to start the brush link arm push-out operation.

FIG. 14 shows a state to start the push-out operation of the brush link arm 1. When the cam gear 4 further rotates counterclockwise in the state of FIG. 13, the surface y of the projection push-down section 20 is brought into contact with the surface b of the projection 21 as shown in FIG. 14. Thereafter, according to the counterclockwise rotation of the cam gear 4, the brush link arm 1 being pushed downward by the push-down section 20 starts rotating from the cleaning position to the side of the shelter position.

Figure 15:
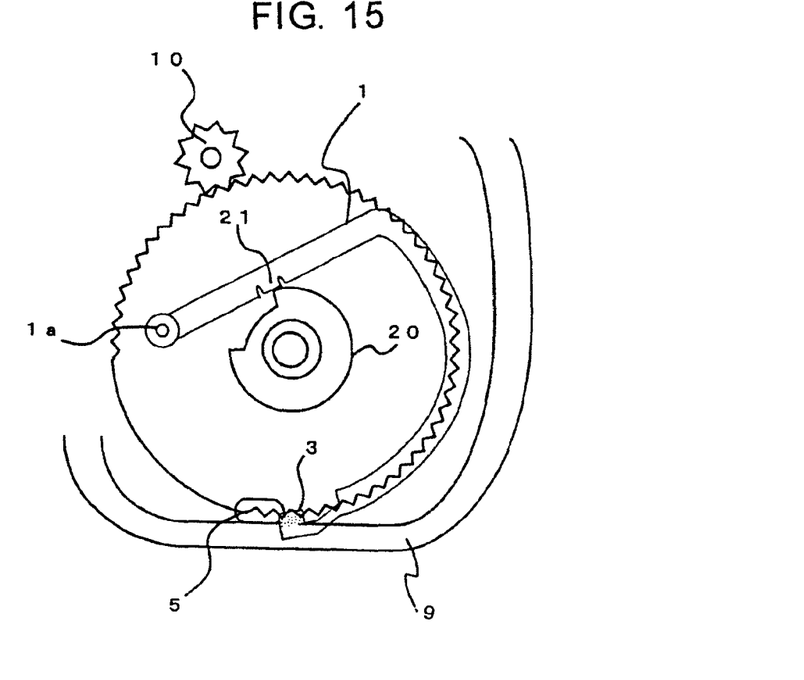
FIG. 15 is a diagram showing operation in which the brush link arm is being pushed out.

FIG. 15 shows a state during the brush link arm push-out operation. When the cam gear 4 continuously rotates counterclockwise in the state of FIG. 14, the circumferential surface of the push-down section 20 rotates to make contact with the surface c of the projection 21 as shown in FIG. 15. As a result, the brush 3 of the brush link arm 1 starts leaving the magnetic head 5.

Figure 16:
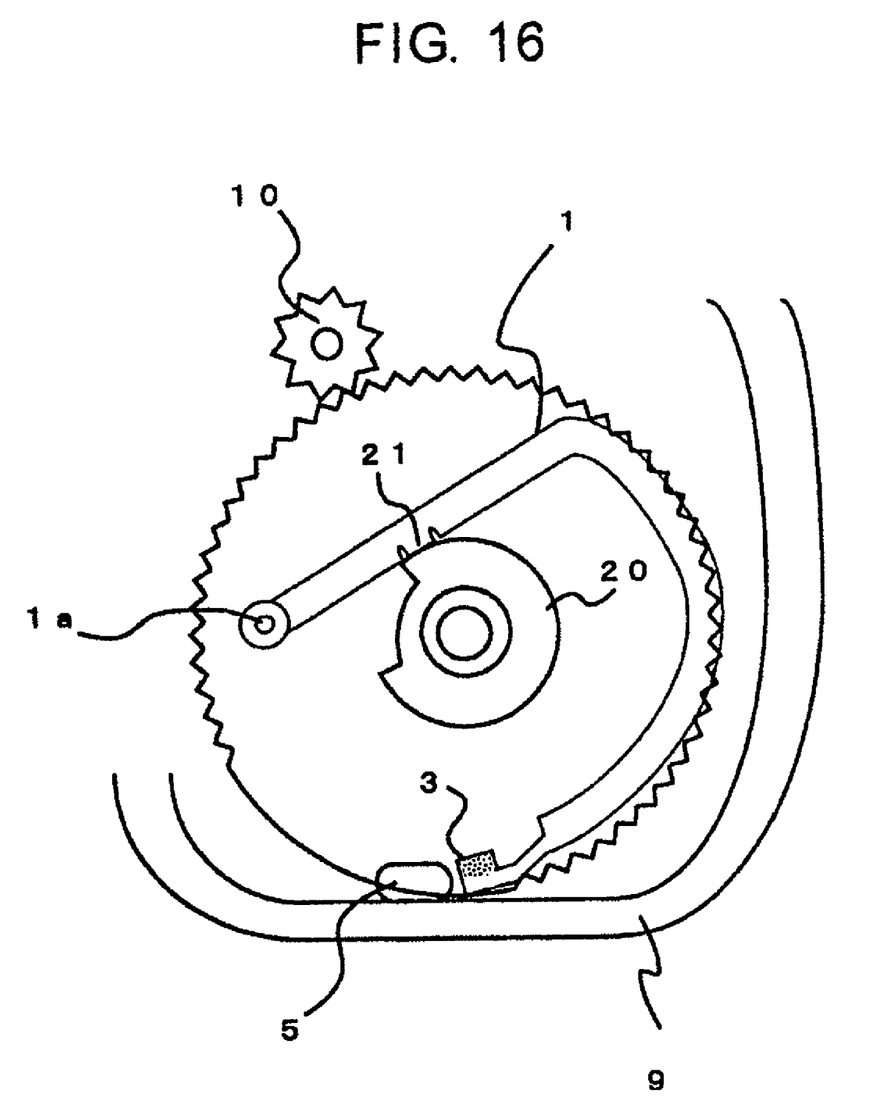
FIG. 16 is a diagram showing a state to return the brush link arm to the shelter position.

FIG. 16 shows a state in which the brush link arm 1 is returned to the shelter position. When the cam gear 4 further rotates counterclockwise in the state of FIG. 15, the circumferential surface of the push-down section 20 adjacent to the surface y completely passes through the surface c of the projection 21 and the brush link arm 1 returns to the shelter position as shown in FIG. 16.

In accordance with the second embodiment, it is possible to drive rotation of the brush link arm 1 without using the energizing force of the torsion spring described in conjunction with the first embodiment. That is, the brush link arm 1 is driven to rotate in association with rotational force of the cam gear stronger than the force of the torsion spring. Therefore, even if hairs of the brush 3 are caught by the magnetic head 5 at the cleaning position, the brush link arm 1 can be forcibly returned to the shelter position.

Also, in accordance with the second embodiment, since the cam gear 4 and the brush link arm 1 are formed in appropriate contours to implement the rotation driving operation, it is not required to additionally install any other parts for the operation.

The second embodiment may also include a spring at the pivot 1a, which is less in energizing force than the torsion spring of the first embodiment. After the state of FIG. 15 takes place, the brush link arm 1 is returned to the shelter position by the force of the spring. That is, substantially only in the push-back operation, the force of the spring is employed in addition to the rotational force of the cam gear 4. It is hence possible to securely restore the brush link arm 1 to the shelter position.

While the invention has been particularly shown and described with reference to the first and second embodiments thereof, the invention is not limited to these embodiments. It will be understood by those of ordinary skill in the art that various changes in form and details may be made therein without departing from the spirit and scope of the present invention as defined claims.

The whole or part of the exemplary embodiments disclosed above can be described as, but not limited to, the following supplementary notes.

(Supplementary note 1) A magnetic head cleaning mechanism, comprising; a threading arm for transporting a leader block which can be engaged with a leader pin disposed at a tip end of a magnetic tape wound around a supply reel, engaging the leader block with the leader pin, and drawing the leader block engaged with the leader pin up to a windup reel; a magnetic head for reading data from and writing data on the magnetic tape by using magnetic force; an arm comprising a cleaning member at a tip end thereof, the arm being supported to be able to rotate, and a cam gear for driving the threading arm, the cam gear being disposed on a side of the magnetic head relative to a track of a threader as a route to transport the magnetic tape, wherein the arm is at a position on a side of the magnetic head relative to the threader track in an ordinary state and the arm rotates, when the leader block is transported to a position near the leader pin, in association with rotation of the cam gear to thereby bring the cleaning member into contact with the magnetic head on the threader track.

(Supplementary note 2) A magnetic head cleaning mechanism in accordance with Supplementary note 1, wherein when the leader block is transported to a position near the leader pin, the cam gear comes into contact with the arm and turns the arm.

(Supplementary note 3) A magnetic head cleaning mechanism in accordance with Supplementary note 1, further comprising a member for reciprocating the magnetic head in a state in which the cleaning member is in contact with the magnetic head.

(Supplementary note 4) A magnetic head cleaning mechanism in accordance with Supplementary note 1, wherein when the leader block reaches an end point of a movable range thereof, the cleaning member is placed at a cleaning position at which the cleaning member comes into contact with the magnetic head.

(Supplementary note 5) A magnetic head cleaning mechanism in accordance with Supplementary note 4, wherein the end point of the movable range of the leader block is a position at which the leader block engages with the leader pin.

(Supplementary note 6) A magnetic head cleaning mechanism in accordance with Supplementary note 1, wherein the arm turns in a space between the cam gear and a data reading and writing unit comprising the magnetic head.

(Supplementary note 7) A magnetic head cleaning mechanism in accordance with Supplementary note 1, further comprising a rotating push-down section disposed in the cam gear for rotating in association with rotation of the cam gear, wherein when the arm is pushed downward by the rotating push-down section, the cleaning member leaves a cleaning position at which the cleaning member comes into contact with the magnetic head, and the arm returns to a position on a side of the magnetic head relative to a track of the threader.

(Supplementary note 8) A magnetic tape apparatus, comprising a magnetic head cleaning mechanism in accordance with one of Supplementary notes 1 to 7.

What is claimed is:

1. A magnetic head cleaning mechanism, comprising:
    a threading arm for transporting a leader block, which can be engaged with a leader pin disposed at a tip end of a magnetic tape wound around a supply reel, engaging the leader block with the leader pin, and drawing the leader block engaged with the leader pin;
    a magnetic head for reading data from and writing data on the magnetic tape by using magnetic force;
    a brush link arm comprising a cleaning member at a tip end thereof, the brush link arm being supported to be able to rotate, and
    a cam gear for driving the threading arm, the cam gear being disposed on a side of the magnetic head relative to a track of a threader as a route to transport the magnetic tape,
    wherein the brush link arm is at a position on a side of the magnetic head relative to the threader track in an ordinary state and
    the brush link arm rotates, when the leader block is transported to a position near the leader pin, in association with rotation of the cam gear to thereby bring the cleaning member into contact with the magnetic head on the threader track, and
    wherein the brush link arm rotates in a plane parallel to a rotational plane of the cam gear.

2. A magnetic head cleaning mechanism in accordance with claim 1, wherein when the leader block is transported to a position near the leader pin, the cam gear comes into contact with the brush link arm and turns the brush link arm.

3. A magnetic head cleaning mechanism in accordance with claim 1, wherein when the leader block reaches an end point of a movable range thereof, the cleaning member is placed at a cleaning position at which the cleaning member comes into contact with the magnetic head.

4. A magnetic head cleaning mechanism in accordance with claim 3, wherein the end point of the movable range of the leader block is a position at which the leader block engages with the leader pin.

5. A magnetic head cleaning mechanism in accordance with claim 1, wherein the brush link arm turns in a space between the cam gear and a data reading and writing unit comprising the magnetic head.

6. A magnetic head cleaning mechanism in accordance with claim 1, further comprising a rotating push-down section disposed in the cam gear for rotating in association with rotation of the cam gear, wherein
    when the brush link arm is pushed downward by the rotating push-down section, the cleaning member leaves a cleaning position at which the cleaning member comes into contact with the magnetic head, and
    the brush link arm returns to a position on a side of the magnetic head relative to a track of the threader.

7. A magnetic tape apparatus, comprising a magnetic head cleaning mechanism in accordance with claim 1.

8. A magnetic tape apparatus, comprising a magnetic head cleaning mechanism in accordance with claim 2.

9. A magnetic tape apparatus, comprising a magnetic head cleaning mechanism in accordance with claim 3.

10. A magnetic tape apparatus, comprising a magnetic head cleaning mechanism in accordance with claim 4.

11. A magnetic tape apparatus, comprising a magnetic head cleaning mechanism in accordance with claim 5.

12. A magnetic tape apparatus, comprising a magnetic head cleaning mechanism in accordance with claim 6.

* * * * *